United States Patent [19]

Muan et al.

[11] Patent Number: 5,070,065

[45] Date of Patent: Dec. 3, 1991

[54] COMPOSITIONS INVOLVING $V_2O_3$-$AL_2O_3$-CAO

[75] Inventors: Arnulf Muan, Lacey Spring, Va.; Mitri S. Najjar, Wappingers Falls, N.Y.

[73] Assignee: Texaco Inc., White Plains, N.Y.

[21] Appl. No.: 563,586

[22] Filed: Aug. 6, 1990

[51] Int. Cl.$^5$ ............................................. B01J 21/04
[52] U.S. Cl. .................................. 502/341; 502/340; 502/353; 502/354; 502/355
[58] Field of Search ............... 502/340, 341, 353, 354, 502/355

[56] References Cited

U.S. PATENT DOCUMENTS

| | | | |
|---|---|---|---|
| 3,925,001 | 12/1975 | Salooja | 502/340 |
| 4,496,785 | 1/1985 | Miller et al. | 502/340 |
| 4,619,910 | 10/1986 | Dyer et al. | 502/332 |
| 4,977,130 | 12/1990 | Najjar et al. | 502/340 |

*Primary Examiner*—Anthony McFarlane
*Attorney, Agent, or Firm*—Robert A. Kulason; James J. O'Loughlin; Albert Brent

[57] ABSTRACT

The present invention pertains to novel phases involving $V_2O_3$, $Al_2O_3$ and CaO, and the method for their preparation. The solid compositions involving $V_2O_3$, $Al_2O_3$, and composition diagram of $V_2O_3$-$Al_2O_3$-CaO as shown in the drawing herein e.g., FIG. 1. The composition may be used as a catalyst for oxidation or reduction reactions.

18 Claims, 1 Drawing Sheet

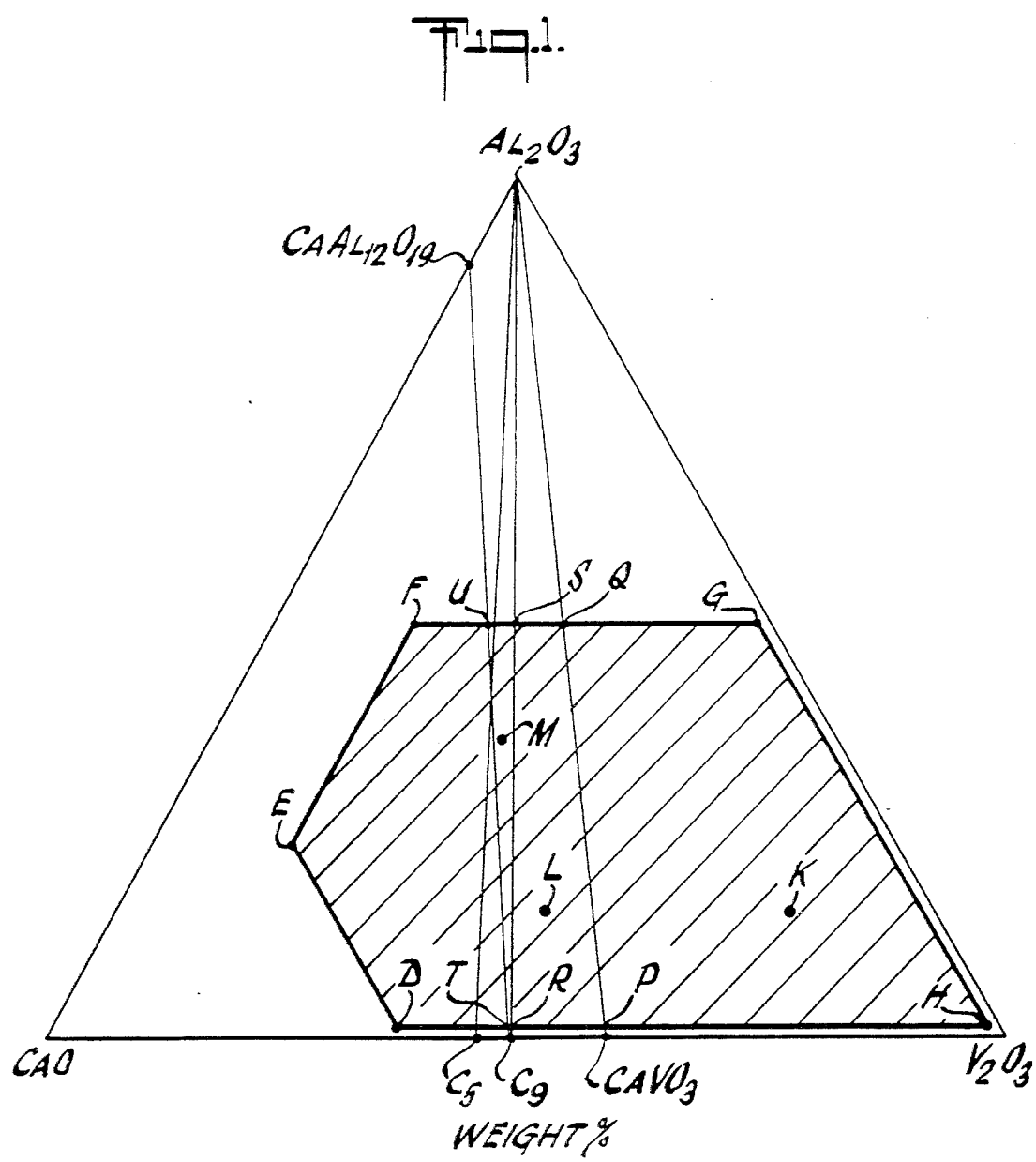

COMPOSITIONS INVOLVING $V_2O_3$-$AL_2O_3$-CAO

BACKGROUND OF THE INVENTION

Field of the Invention

This invention relates to compositions involving $V_2O_3$-$Al_2O_3$-CaO.

SUMMARY OF THE INVENTION

The present invention pertains to novel solid compositions involving $V_2O_3$-$Al_2O_3$-CaO and the method for their preparation. The solid compositions involving $V_2O_3$-$Al_2O_3$-CaO fall within a polygon in a ternary composition diagram of $V_2O_3$-$Al_2O_3$-CaO as described in the drawing herein e.g. FIG. 1. The polygon has the vertices and corresponding coordinates in weight percent as shown in Table I.

TABLE I

| Vertices | Coordinates (wt %) | | |
|---|---|---|---|
| | $V_2O_3$ | $Al_2O_3$ | CaO |
| D | 37 | 1 | 62 |
| E | 15 | 23 | 62 |
| F | 15 | 48 | 37 |
| G | 51 | 48 | 1 |
| H | 98 | 1 | 1 |

The compositions involving $V_2O_3$, $Al_2O_3$ and CaO having compositions falling within the polygon shaped shaded area in the ternary composition diagram of $V_2O_3$, $Al_2O_3$ and CaO as shown in the FIG. 1 are made by the process comprising the steps of:

(1) heating $V_2O_5$ powder having a particle size of less than about 50 microns in an atmosphere in which the partial pressure of oxygen is in the range of $10^{-6}$ to $10^{-10}$ atmosphere and the $CO_2/H_2$ volume ratio is in the range of about 10/1 to 1/1 while gradually increasing the temperature stepwise over a temperature range of about 600° C. to 1300° C. and holding the final temperature at about 1300° C. for a period of at least about 24 hrs. to ensure complete reduction of all vanadium to $V^{3+}$;

(2) heating $Al_2O_3$ powder having a particle size of less than about 50 microns for a period of about 10 to 14 hrs. at a temperature in the range of about 1000° C. to 1200° C.;

(3) heating $CaCO_3$ powder having a particle size of less than about 50 microns for a period of about 10 to 14 hours at a temperature in the range of about 600° C. to 1100° C.; whereby, substantially all of said $CaCO_3$ is converted into CaO;

(4) thoroughly grinding together about 15 to 98 wt. % of $V_2O_3$ from (1) with about 1 to 48 wt.% of $Al_2O_3$ from (2) and about 1 to 62 wt. % of CaO from (3) to produce a mixture having a grain size of less than about 50 microns.

(5) pelletizing the mixture from (3) at a pressure of about 5,000 psi; and (6) heating and reacting together the mixture of pellets from (5) at a temperature in the range of about 700° C. to 1500° C. for a period in the range of about 12 to 48 hrs. in an atmosphere in which the partial pressure of oxygen is in the range of $10^{-10}$ to $10^{-6}$ atmosphere to produce said solid composition involving $V_2O_3$, $Al_2O_3$ and CaO.

In one embodiment, the pellets from step (6) are cooled to ambient temperature while at substantially the same partial pressure of oxygen as in step (6). Preferably, to prevent undue oxidation and moisture pickup, the cooled pellets are stored in a sealed container.

BRIEF DESCRIPTION OF THE DRAWING

The drawing e.g. FIG. 1 depicts a ternary composition diagram showing a polygon shaped shaded area circumscribed by DEFGH within which useful compositions involving $V_2O_3$, $Al_2O_3$ and CaO are found.

DESCRIPTION OF THE INVENTION

The subject newly synthesized solid compositions involving $V_2O_3$, $Al_2O_3$ and CaO and mixtures thereof are depicted in FIG. 1. This work has led to synthesizing new phases in which vanadium in several oxidation states are accommodated such as to render crystalline phases thermodynamically stable over a wide range of oxygen pressures at elevated temperatures.

The newly synthesized solid compositions involving $V_2O_3$, $Al_2O_3$ and CaO are shown as falling within the polygon shaped shaded area in the ternary composition diagram in the FIG. 1. The oxidation states of vanadium in the substitutional solid compositions vary in the range of +3 to +5. The polygon shaded area DEFGH has the following vertices and corresponding coordinates in weight percent:

| Vertices | Coordinates (wt %) | | |
|---|---|---|---|
| | $V_2O_3$ | $Al_2O_3$ | CaO |
| D | 37 | 1 | 62 |
| E | 15 | 23 | 62 |
| F | 15 | 48 | 37 |
| G | 51 | 48 | 1 |
| H | 98 | 1 | 1 |

Three stable intermediate phases designated $C_5$, $C_9$, and $CaVO_3$ are depicted in FIG. 1. $C_5$ is used herein to designate a complex calcium vanadate of the general formula $Ca_5V_3O_x$, where X=9.5–12.5. $C_9$ is used herein to designate a complex calcium vanadate of the general formula $Ca_9V_6O_x$, where x=18–24.

A first newly synthesized material comprises a solid solution of $V_2O_3$ with $Al_2O_3$, wherein the $Al_2O_3$ is present in admixture with said $V_2O_3$ in the amount of about 1–20 wt.% (basis wt. of mixture). Included in said solid solution are mixtures of $CaVO_3$ and $Al_2O_3$, wherein the $Al_2O_3$ is present in the amount of about 5.0 to 45.0 wt.% (basis wt. of mixture). These compositions exist within that portion of the area of composition triangle $CaVO_3$-$Al_2O_3$-$V_2O_3$ that falls within polygon DEFGH, as shown in FIG. 1, wherein said portion of common area is a polygon circumscribed by PQGH. This composition is illustrated by point K in FIG. 1 having the following coordinates in wt.%: $V_2O_3$ 70, $Al_2O_3$ 15 and CaO 15. The onset of partial melting in this composition is in the range of about 1025° C. to 1075° C.

A second newly synthesized material comprises the phases $CaVO_3$, $C_9$ and $Al_2O_3$. These compositions exist within that portion of the area of composition triangle $C_9$-$Al_2O_3$-$CaVO_3$ that falls within polygon DEFGH. As shown in FIG. 1 said common area is a polygon circumscribed by RSQP. This composition is illustrated by point L in FIG. I having the (7 following coordinates in wt.%. $V_2O_3$ 45, $Al_2O_3$ 15 and CaO 40. The onset of partial melting of this composition is in the range of about 1035° C. to 1085° C.

A third newly synthesized material comprises the $C_9$, $CaO \cdot 6Al_2O_3$, and $Al_2O_3$. These compositions exist within that portion of the area of composition triangle $C_9$-$CaAl_{12}O_{19}$ - $Al_2O_3$ that falls within polygon DEFGH. As shown in FIG. 1, this common area is a polygon circumscribed by TUSR. This composition is illustrated by point M in FIG. I having the following coordinates in wt.%: $V_2O_3$ 30, $Al_2O_3$ 35, and CaO 35. The onset of partial melting in this composition is about 1425° C. to 1475° C.

The subject compositions made from $V_2O_3$, $Al_2O_3$ and CaO are synthesized in the following manner. The identity of the reaction product, stable solid phases involving $V_2O_3$, $Al_2O_3$ and CaO may be confirmed by X-ray diffraction analysis.

First, $V_2O_3$ is prepared by heating commercially available analytical-grade $V_2O_5$ having a particle size of less than about 50 microns in a vertical tube furnace in an atmosphere of carefully selected oxygen pressure within the stability range of $V_2O_3$ e.g. in the range of $10^{-6}$ to $10^{-10}$ atmospheres. This is accomplished by using a gas mixture of high-purity $CO_2$ and $H_2$ in controlled proportions. The $CO_2/H_2$ ratio by volume is in the range of 10/1 to 1/1. The relatively low melting point of the starting vanadium oxide ($V_2O_5$), e.g. about 690° C., necessitates heating the oxide slowly. Starting at a temperature of about 600° C., the temperature is gradually increased stepwise over a period of about 12 to 24 hrs. to a final temperature of about 1300° C. At that temperature the oxide is held at least about 24 hrs. e.g. 24 to 30 hrs to ensure complete reduction of all vanadium to $V^{3+}$.

Preheated analytical-grade oxides having a particle size of less than about 50 microns are used as starting materials for the other components of the stable solid phases to be synthesized. The $CaCO_3$ is heated for about 10 to 14 hrs at a temperature in the range of about 600° C. to 1100° C. prior to being used in preparation of the final materials. By this means, substantially all, e.g. more than 95 wt.% of the $CaCO_3$ is converted in CaO. $Al_2O_3$ is separately heated for about 10 to 14 hrs at a temperature in the range of about 1000° C. to 1200° C. prior to being used in preparation of the final mixtures.

The mixtures of the three oxide components are mechanically ground together under acetone in an agate mortar to ensure thorough mixing and a sufficiently small grain size e.g. less than 50 microns. For example, about 15 to 98 wt.% of $V_2O_3$ is ground together with about 1 to 62 wt.% of CaO and about 1 to 48 wt.% of $Al_2O_3$ to produce a mixture having a grain size of less than about 50 microns. Complete formation of the desired compounds in the succeeding heat treatment is thereby promoted. Next, the oxide mixtures are pelletized at a pressure of about 5,000 psi or higher. The pellets may have any conventional size e.g. 1/16" to 1". The pellet mixture is then heated at a temperature in the range of about 700° C. to 1500° C., such as about 700° C. to 1050° C. or about 1050° C. to 1500° C. for a period in the range of about 12 to 48 hrs. (depending on the nature and solidus temperature of the phase to be synthesized) in a vertical tube furnace with carefully controlled oxygen pressures, in the range of $10^{-10}$ to $10^{-6}$ atmosphere. In the manner described previously for preparing $V_2O_3$, the pellets are heated in a furnace atmosphere provided by a gas mixture of $CO_2$ and $H_2$ in various desired mixing ratios, typically in the range of about 10/1 to 1/1. These selected ratios are kept constant for the duration of the synthesis by use of a differential manometer. By this method the oxygen pressure at the specified temperature can be controlled to better than $\pm 1\%$. The thermodynamic data for the water-gas reaction ($CO_2 + H_2 = CO + H_2O$), on which the calculations were based, are known with extremely high accuracy (better than 0.1%), and hence the method used ensures reliable accurate control of the oxidation state of vanadium during the synthesis. This is extremely important for optimization of the properties of the finished product.

At the time of the high temperature reaction, all of the oxide pellets may be in the solid state or at least one, two or three of the oxide constituents may be in the molten state. At the reaction conditions prevailing in the subject process, solid solutions may be made by solid-state reactions considerably below temperatures at which a liquid phase is present. However, the presence of a liquid phase or a solid-liquid phase improves the kinetics of the reaction.

The individual oxide components were heated to a sufficiently high temperature to expel absorbed or adsorbed water. Well defined starting materials for accurately weighing up mixtures are thereby produced. As previously described, $V_2O_5$ was heated slowly to a temperature of about 1300° C. at controlled oxygen pressures in order to decompose the $V_2O_5$ slowly to $V_2O_3$. By this means, violent reactions are avoided at the highest temperatures, and the vanadium is produced in the desired oxidation state $V^{3+}$.

The oxide mixtures were heated at temperatures in the range of about 700° C. to 1500° C. in order to promote reaction among the oxide components to the desired finished products consisting mainly of one or more (solid-solution) phases. In one embodiment, the mixture of solid particles was heated to a temperature below the solidus, for example to about 1000° C. The phase assemblage of the final -product was produced entirely by solid state reaction. Under such conditions, the reaction products were relatively small, typically, of about 0.1 to 5.0 microns. In another embodiment, the mixtures were heated to a sufficiently high temperature e.g. about 1500° C. to produce partial or complete melting. This speeds up the reaction and produces reaction products of larger size, typically in the range of about 2–75 microns. After heating the mixtures at this high temperature for a period of time, such as 12–48 hrs, the composition is cooled to ambient conditions. For example, the composition may be cooled slowly (over a period of $\frac{1}{2}$–1 hr) to about 1200° C. From this temperature, the composition may be cooled rapidly (quenched) to room temperature. During these runs the oxygen pressure of the gas phase was controlled by using gas mixtures of $CO_2$ and $H_2$, $CO_2$ and CO, or $H_2O/H_2$ in the range of about 10/1 –1/1. These selected ratios are kept constant for the duration of the synthesis, for example, by use of a differential manometer.

The new solid compositions that have been synthesized by the subject invention at relatively reducing conditions imposed by a $CO_2$-$H_2$ atmosphere with a $CO_2/H_2$ volume ratio that provides a controlled partial pressure of oxygen in the range of about $10^{-6}$–$10^{-10}$ have stable oxidation states that vary in the range of about +3 to +5.

The pellets of the composition involving $V_2O_3$-$Al_2O_3$-CaO may be used as an oxidation or reduction catalyst in the conventional catalytic oxidation or reduction of a reactant material such as an organic material or an oxygen containing gas. They offer improved activity and yields and greater stability over a wider temperature range e.g. about 900° C. or higher than that which is offered by typical oxidation catalysts. For example, as an oxidation catalyst the subject pellets may be used in the conversion of o-xylene to phthalic anhydride, butene to maleic anhydride, or alcohols to aldehydes or organic acids. As a reduction catalyst, the pellets may be used to reduce the oxide of nitrogen to nitrogen.

As previously noted, the newly identified solid compositions involving $V_2O_3$-$Al_2O_3$-CaO contain vanadium in many different oxidation states. This is important for the oxidation-reduction catalysts described above. Further the CaO may moderate the acidity and make these materials selective oxidation- reduction catalysts. In addition, they are stable solids at relatively high temperatures.

Various modifications of the invention as herein before set forth may be made without departing from the spirit and scope thereof, and therefore, only such limitations should be made as are indicated in the appended claims.

We claim:

1. A composition produced from $V_2O_3$, $Al_2O_3$ and CaO wherein said composition falls within polygon DEFGH as shown in the disclosed FIG.; wherein the amounts of $V_2O_3$, $Al_2O_3$ and CaO are characterized as shown in the table below;

| Vertices | Coordinates (wt %) | | |
|---|---|---|---|
| | $V_2O_3$ | $Al_2O_3$ | CaO |
| D | 37 | 1 | 62 |
| E | 15 | 23 | 62 |
| F | 15 | 48 | 37 |
| G | 51 | 48 | 1 |
| H | 98 | 1 | 1. |

2. A composition as provided in claim 1 and as illustrated by point K in said disclosed FIG., wherein said composition has the following coordinates in wt.%: $V_2O_3$ 70, $Al_2O_3$ 15, and CaO 15.

3. A composition as provided in claim 1 wherein said composition exists within PQGH.

4. A composition as provided in claim 1 and as illustrated by point L in said disclosed Figure, wherein said composition has the following coordinates in wt.%: $V_2O_3$ 45, $Al_2O_3$ 15 and CaO 40.

5. A composition as provided in claim 1, wherein said composition exists within polygon RSQP.

6. A composition as provided in claim 1, and as illustrated by point M in said disclosed Figure, wherein said composition has the following coordinates in wt.% $V_2O_3$ 30, $Al_2O_3$ 35 and CaO 35.

7. A composition as provided in claim 1 wherein said composition exists within polygon TUSR.

8. A composition as provided in claim 1 wherein said composition is a solid solution.

9. A method of preparing a composition from $V_2O_3$, $Al_2O_3$ and CaO wherein said composition falls within the polygon DEFGH as shown in the disclosed Figure, and wherein said method comprises the steps of:

(1) heating $V_2O_5$ powder having a particle size of less than about 50 microns in an atmosphere in which the partial pressure of oxygen is in the range of $10^{-6}$ to $10^{-10}$ atmospheres while starting at a temperature of about 600° C. and gradually increasing the temperature over a period in the range of about 12 to 24 hours to about 1300° C. and holding the temperature at about 1300° C. for a period to ensure complete reduction of all vanadium to $V^{3+}$;

(2) heating $Al_2O_3$ powder having a particle size of less than about 50 microns for a period of about 10 to 14 hrs at a temperature in the range of about 1000° C. to 1200° C.;

(3) heating $CaCO_3$ powder having a particle size of less than about 50 microns for a period of about 10 to 14 hrs at a temperature in the range of about 600° C. to 1100° C., whereby substantially all of said $CaCO_3$ is converted into CaO;

(4) thoroughly grinding together about 15 to 98 wt.% of $V_2O_3$ from (1), with about 1 to 48 wt.% of $Al_2O_3$ from (2), and about 1 to 62 wt.% of CaO from (3) to produce a mixture having a grain size of less than about 50 microns;

(5) pelletizing the mixture from (4) at a pressure of about 5000 psi; and (6) heating and reacting together the mixture of pellets from (5) at a temperature in the range of about 700° C. to 1500° C. for a period in the range of about 12 to 48 hrs in an atmosphere in which the partial pressure of oxygen is in the range of $10^{-10}$ to $10^{-6}$ atmosphere.

10. The method of claim 9 wherein said Figure the amounts of $V_2O_3$, $Al_2O_3$ and CaO are characterized as shown in the Table below;

| Vertices | Coordinates (wt %) | | |
|---|---|---|---|
| | $V_2O_3$ | $Al_2O_3$ | CaO |
| D | 37 | 1 | 62 |
| E | 15 | 23 | 62 |
| F | 15 | 48 | 37 |
| G | 51 | 48 | 1 |
| H | 98 | 1 | 1. |

11. The method of claim 9 provided with the steps of cooling the pellets from (6) to ambient temperature, while at substantially the same partial pressure of oxygen as in (6); and storing the cooled pellets in a sealed container.

12. The method of claim 9 wherein said composition is a solid solution.

13. The method of claim 9 where in step (6) said pellets are heated in an atmosphere involving a gas mixture of $CO_2$ and $H_2$ with a volume ratio of $CO_2/H_2$ in the range of about 10/1 to 1/1.

14. The method of claim 9 where in steps (1) and (6) said materials are heated in an atmosphere involving a gas mixture of $CO_2$ and CO or $H_2O$ and $H_2$ in volumetric ratios $CO_2/CO$ or $H_2O/H_2$ in the range of about 10/1 to 1/1.

15. The method of claim 9 wherein said composition is illustrated by point K in said disclosed Figure wherein said composition has the following coordinates in wt. %: $V_2O_3$ 70, $Al_2O_3$ 15 and CaO 15.

16. The method of claim 9 wherein said composition is illustrated by point L in said disclosed Figure wherein said composition has the following coordinates in wt. %: $V_2O_3$ 45, $Al_2O_3$ 15 and CaO 40.

17. The method of claim 9 wherein said composition is illustrated by point M in said disclosed Figure wherein said composition has the following coordinates in wt.%: $V_2O_3$ 30, $Al_2O_3$ 35 and CaO 35.

18. Composition produced from $Al_2O_3$, $V_2O_3$ and CaO wherein the oxidation state of the vanadium in said composition is in the range of about +3 to +5 and wherein said composition is characterized by its ability to catalyze oxidation-reduction reactions and said composition falls within the polygon DEFGH as shown in the disclosed Figure, and wherein the amounts or $Al_2O_3$, $V_2O_3$ and CaO are characterized as shown in Table I.

* * * * *